May 8, 1956     R. H. MERRITT     2,744,597
CLUTCH MECHANISM

Filed Nov. 6, 1952     2 Sheets-Sheet 1

INVENTOR.
Robert H. Merritt
BY
Donald L. Royer

May 8, 1956  R. H. MERRITT  2,744,597
CLUTCH MECHANISM
Filed Nov. 6, 1952  2 Sheets-Sheet 2

INVENTOR.
Robert H. Merritt.
BY
Donald L. Royer

United States Patent Office 2,744,597
Patented May 8, 1956

2,744,597

CLUTCH MECHANISM

Robert H. Merritt, Los Angeles, Calif.

Application November 6, 1952, Serial No. 319,107

12 Claims. (Cl. 192—35)

This invention relates to a clutch mechanism and more particularly to a clutch mechanism adapted for use in connection with a pair of relatively rotating shafts.

It is an object of the invention to provide a novel clutch mechanism that may be contained and operated in a shaft.

A further object of the invention is to provide a novel in-shaft clutch device having partially self-energizing features and operating mechanism.

Another object of the invention is to provide a novel in-shaft clutch device that is relatively simple in construction, economical in manufacture, effective in use, and reliable in operation.

A still further object of the invention is to provide a novel in-shaft clutch device having high holding power under high torque conditions.

A further object of the invention is to provide a novel in-shaft clutch device that may be utilized also in a braking device in relatively small diameter shafts.

Other and further important objects of the invention will become apparent from the following detailed description, appended claims and accompanying drawings, wherein:

Figure 1:
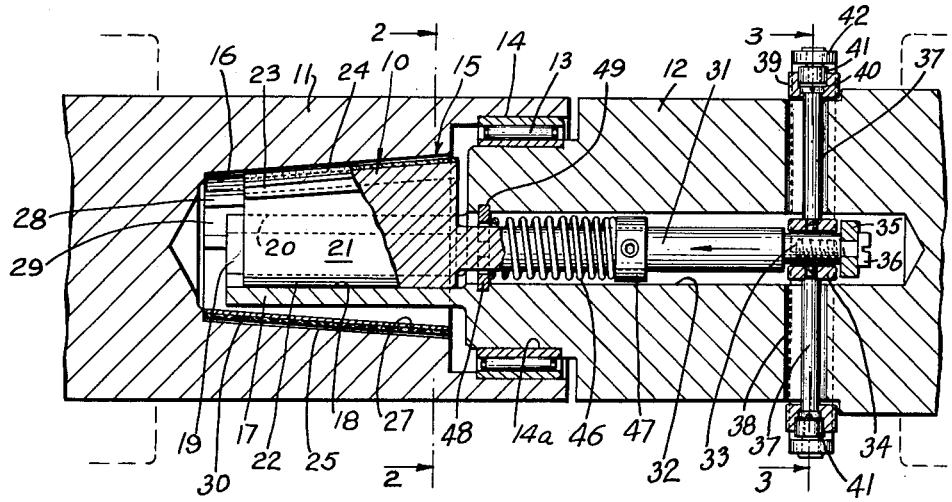
Fig. 1 is a longitudinal sectional view of the clutch of the present invention.

Referring to the drawing by reference characters, the clutch device of the present invention is shown as indicated generally at 10. As shown in Fig. 1, the clutch device is adapted for use with a pair of coextensive shafts 11 and 12 which are mounted for rotation relative to each other by means of a suitable bearing 13 mounted in races 14 and 14a on the shafts 11 and 12 respectively.

The shaft 11 is provided with a conical axially disposed recess 15 which has an inwardly directed conical surface 16. A substantially U-shaped elongated anchor 17 is formed integral with the shaft 12 and is adapted to extend therefrom and into the interior area of the recess 15. The anchor 17 has an inwardly directed arcuate axial surface 18, side portions 19 and outwardly extending stop portions 20, the purpose of which will be later described.

An elongated actuating member 21 is positioned on the anchor 17 and has a surface 22 which is adapted for cooperation with the surface 18 of the anchor so that the actuating member may be permitted axial and circumferential movement on the anchor. The actuating member further has a head portion 23 which is adapted to support suitable lining 24, the head portion 23 and the lining 24 being of a configuration to enable cooperation with the surface 16 of the recess 15. The circumferential length of the head portion 23 is such as to occupy approximately one sixth of the circumference of the surface of the recess 15.

Figure 2:
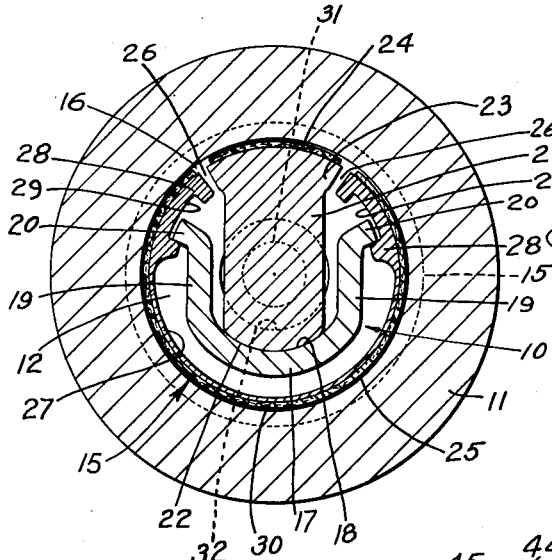
Fig. 2 is an enlarged transverse sectional view taken substantially as indicated by line 2—2, Fig. 1.
Figure 3:
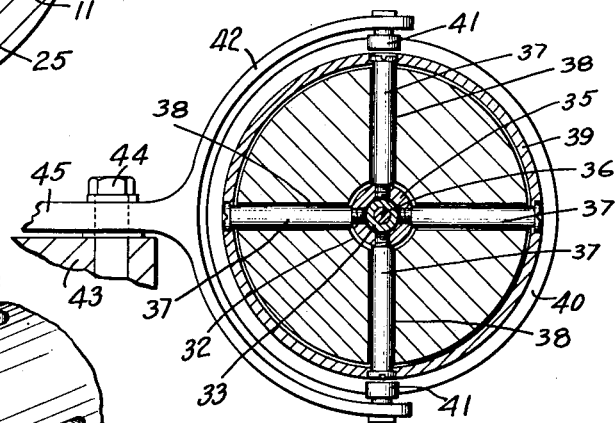
Fig. 3 is a transverse sectional view through the operating mechanism of the present clutch device and taken substantially as indicated by line 3—3, Fig. 1.
Figure 4:
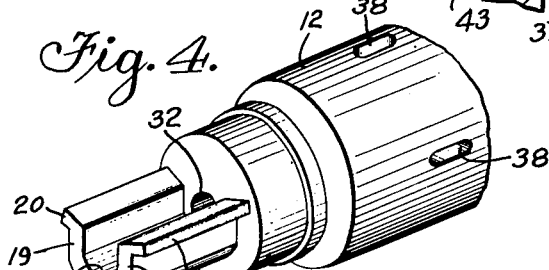
Fig. 4 is a perspective view showing one of the shaft members and the associated anchor means.

An elongated engaging member 25 is positioned adjacent the actuating member 21 and is adapted to occupy substantially the balance of the circumferential area of the recess 15 not occupied by the actuating member 21, there being a slight space 26 between the adjacent ends on the actuating and engaging members. The engaging member 25 has a central portion 27 formed into a relatively thin band so as to provide a spring-like structure and to maintain the member 25 in a normal retracted position as shown in Fig. 2. The circumferential ends of the engaging member 25 have enlargement 28 formed thereon, these enlargements, each having inwardly directed channels 29, which are adapted to receive the stop portions, will normally lie in the ends of the channels remote from the circumferential ends of the engaging member, as shown in Fig. 2. Suitable lining 30 is provided on the engaging member.

The operating mechanism for the present clutch device comprises an elongated shaft 31 which is formed integral with the actuating member 21 and is adapted to extend into an enlarged bore 32 formed axially in the end of the shaft 12. The end of the actuating member 21 has a reduced diameter portion 33 which is adapted to loosely support a collar 34, the collar being maintained thereon by means of a retaining member 35 and a screw 36. A plurality of spaced shafts 37 are secured to the collar 34 and extend radially therefrom through radially extending transverse slots 38 in the shaft 12. The outer ends of the shafts 37 are secured to a ring 39 which is spaced from and adapted to surround the outer periphery of the shaft 12. The ring 39 has an outwardly directed annular groove 40 which is adapted to receive a pair of rollers 41 which are, in turn, rotatably mounted on a suitable support 43 as at 44, an operating handle 45 extending therefrom.

To insure return of the actuating member 21 to the normal position as indicated in Fig. 1, a spring 46 is positioned about the inner end of the shaft 31, one end of which being adapted to bear against a collar 47 on the shaft 31 and the other end being adapted to bear against a snap ring 48 which is secured in a groove 49 adjacent the outer end of the bore 32.

In operation, upon axial movement of the ring 39 by the yoke 42, the shaft 31 will be moved axially due to the connection between the ring 39 and the shaft, through the collar 34 and the radial shafts 37. The actuating member will thereby be moved axially even though the shafts 11 and 12 may be rotating simultaneously or individually. Upon engagement of the actuating member 21 with the moving surface 16 of the bore 15, the actuating member will be moved in the direction of rotation in a circumferential direction along the surface 18 of the anchor 17. This action will close one of the spaces 26 intermediate the actuating and engaging members to permit the head 23 to abut the associated end of the engaging member and thereby rotate the engaging member 25 and expand same into contact with surface 16, the other end of the engaging member being held against rotation by means of the stop portion 20 and its engagement with one wall of one of the channels 29. Upon relaxation of the force being applied through the handle 45 of the yoke 42, the spring 46 will return the actuating member 21 to its normal position and the spring-like character of the portion 27 of the engaging member will abut this member to also return to its normal position. It may be seen that the construction is such that a secure engagement is made between the shafts 11 and 12 while the shaft 11 is rotating in either direction, in which case, the other of the channels 29 and its associated stop 20 will be brought into play. For efficient operation, the linings 24 and 30 on the actuating member 21 and the engaging member 25 respectively are positioned so as to just clear the surface 16 of the recess 15. Axial movement therefore need only be slight in order to bring the actuating member into contact with the surface 16.

Figure 5:
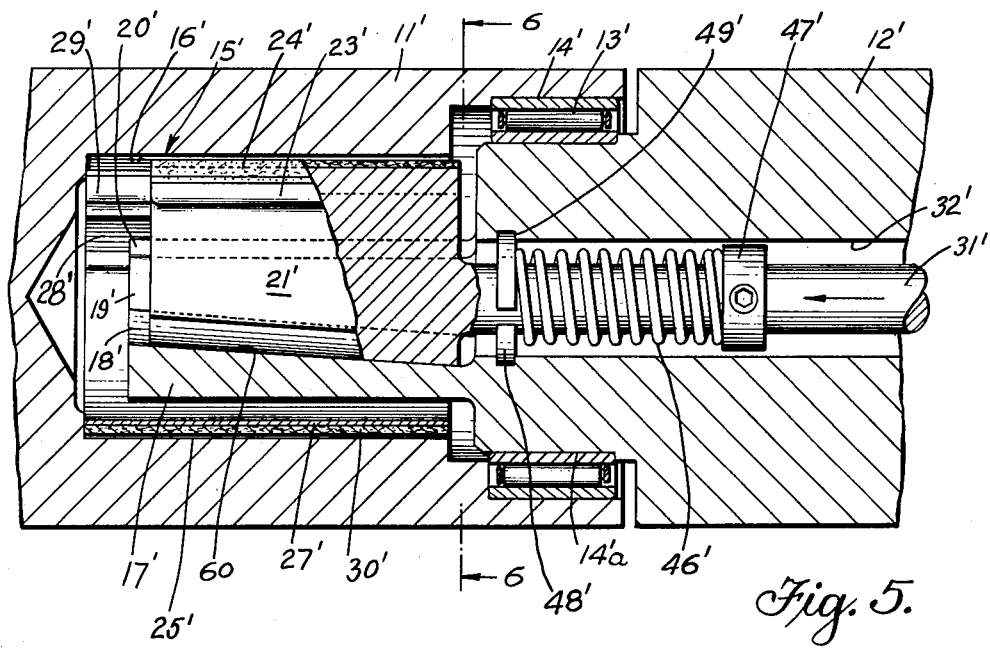
Fig. 5 is a longitudinal sectional view similar to Fig. 1 and showing a modified form of the clutch device.
Figure 6:
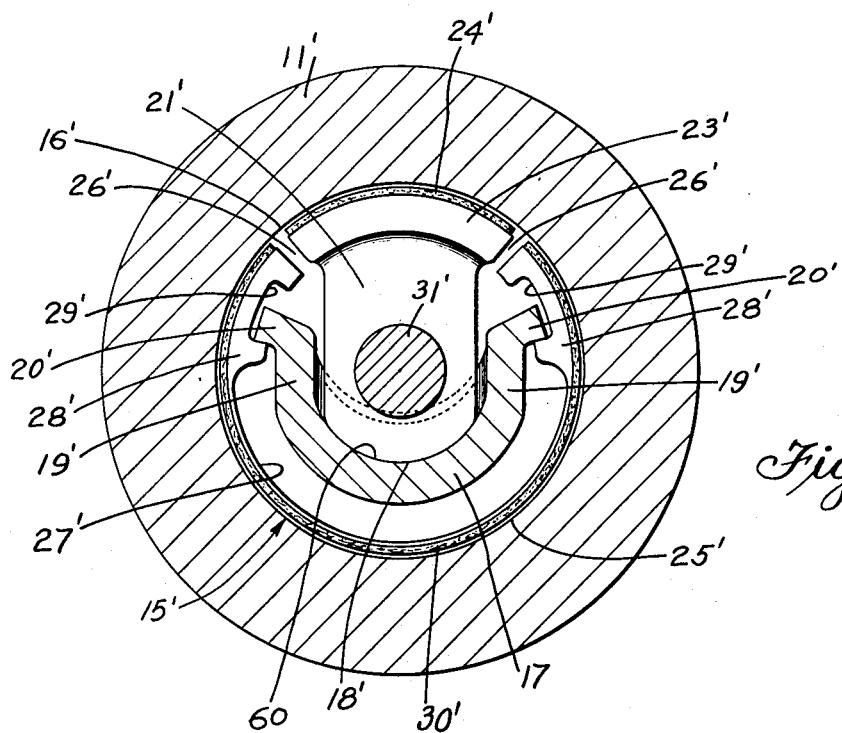
Fig. 6 is an enlarged transverse sectional view taken substantially as indicated by line 6—6, Fig. 5.

In Figs. 5 and 6, a modified form of the invention is illustrated wherein like parts are indicated by single primed reference characters. In this form of the invention, the recess 15' is formed cylindrically thus presenting a cylindrical inwardly directed surface 16'. The actuating member 21' is moved into engagement with the surface 16' by axial movement along an inclined plane 60 formed on the inwardly directed surface of the anchor 17'. Enough flexibility exists in the connection between the actuating member and its associated operating mechanism to enable radial, axial and circumferential movement of the actuating member.

The clutch device of this invention may also be utilized as a brake by intermittent application of axial force to the actuating member 21 or 21' and the construction of both modifications of the device is such as to enable use with extremely small diameter shafts. The relatively few parts in the devices reduce the expense of manufacture and add to the simplicity in service and installation.

Having thus described the invention and the present embodiment thereof, it is desired to emphasise the fact that many modifications may be resorted to in a manner limited only by a just interpretation of the following claims.

I claim:

1. A clutch mechanism comprising, in combination: a pair of coextensive shaft members adapted for relative rotation; an axial recess in one of such shafts, said recess having a radially inwardly directed surface; anchor means associated with the other of said shafts; an actuating member mounted for axial and circumferential movement on said anchor; an engaging member positioned adjacent said actuating member; unidirectional stop means carried by said engaging member and adapted for association with said anchor means; operating means to move said actuating member into contact with said surface whereby, upon contact of said actuating member with said surface and circumferential rotation thereby, to abut and move said engaging member into contact with said surface.

2. A clutch mechanism comprising, in combination: a pair of coextensive shaft members adapted for relative rotation; an axial recess in one of said shafts, said recess having a radially inwardly directed surface; anchor means associated with the other of said shafts and projecting axially into said recess; an actuating member mounted for axial and circumferential movement relative to said surface; an engaging member positioned adjacent said actuating member; unidirectional stop means carried by said engaging member and adapted for association with said anchor means; and operating means to move said actuating member into contact with said surface whereby, upon contact of said actuating member with said surface and circumferential rotation thereby, to abut and move said engaging member into contact with said surface.

3. A clutch mechanism comprising, in combination: a pair of coextensive shaft members adapted for relative rotation; an axial recess in one of said shafts, said recess having a radially inwardly directed surface; anchor means associated with the other of said shafts and projecting axially into said recess; an actuating member mounted for axial and circumferential movement on said anchor means, said actuating member having a portion engageable with said surface; an engaging member positioned in said recess adjacent said actuating member; unidirectional stop means carried by said engaging member and adapted for association with said anchor means; and operating means to move said actuating member into contact with said surface upon axial movement thereof whereby, upon contact of said actuating member with said surface and circumferential rotation thereby, to abut and move said engaging member into contact with said surface.

4. A clutch mechanism comprising, in combination: a pair of coextensive shaft members adapted for relative rotation; an axial recess in one of said shafts, said recess having a radially inwardly directed surface; anchor means associated with the other of said shafts; an actuating member mounted for axial and circumferential movement on said anchor means, said actuating member having a portion engageable with said surface; an engaging member positioned adjacent said actuating member, said engaging member comprising a relatively thin spring-like band for normally urging said engaging member away from said surface; unidirectional stop means carried by said engaging member and adapted for association with said anchor means; and operating means to move said actuating member into contact with said surface whereby, upon contact of said actuating member with said surface and circumferential rotation thereby, to abut and move said engaging member into contact with said surface.

5. A clutch mechanism comprising, in combination: a pair of coextensive shaft members adapted for relative rotation; an axial recess in one of said shafts, said recess having a radially inwardly directed surface; anchor means associated with the other of said shafts; an actuating member mounted for axial and circumferential movement on said anchor means, said actuating member having a portion engageable with said surface; an engaging member positioned adjacent said actuating member; unidirectional stop means carried by said engaging member and adapted for association with said anchor means; operating means to move said actuating member into contact with said surface whereby, upon contact of said actuating member with said surface and circumferential rotation thereby, to abut and move said engaging member into contact with said surface; and spring means for returning said actuating member to its initial position.

6. A clutch mechanism comprising, in combination: a pair of coextensive shaft members adapted for relative rotation; an axial recess in one of said shafts, said recess having a radially inwardly directed surface; anchor means associated with the other of said shafts and projecting axially into said recess; an actuating member mounted for axial and circumferential movement on said anchor means, said actuating member having a portion engageable with said surface; an engaging member positioned in said recess adjacent said actuating member, said engaging member comprising a relatively thin spring-like band for normally urging said engaging member away from said surface; unidirectional stop means carried by said engaging member and adapted for association with said anchor means; operating means to move said actuating member into contact with said surface upon axial movement thereof whereby, upon contact of said actuating member with said surface and circumferential rotation thereby, to abut and move said engaging member into contact with said surface; and spring means for returning said actuating member to its initial position.

7. A clutch mechanism comprising, in combination: a pair of coextensive shaft members adapted for relative rotation; a conical axial recess in one of said shafts, said recess having a radially inwardly directed conical surface; anchor means associated with the other of such shafts; an actuating member mounted for axial and circumferential movement on said anchor means, said actuating member having a portion engageable with said surface; an engaging member positioned adjacent said actuating member; unidirectional stop means carried by said engaging member and adapted for association with said anchor means; and operating means to move said actuating member into contact with said surface whereby, upon contact of actuating member with said surface and circumferential rotation thereby, to abut and move said engaging member into contact with said surface.

8. A clutch mechanism comprising, in combination: a pair of coextensive shaft members adapted for relative rotation; a conical axial recess in one of such shafts, said recess having a radially inwardly directed conical surface; anchor means associated with the other of said shafts and projecting axially into said recess; an actuating member mounted for axial and circumferential movement on said anchor means, said actuating member having a conical portion engageable with said conical surface of said axial recess; an engaging member positioned adjacent said actuating member; unidirectional stop means carried by said engaging member and adapted for association with said anchor means; and operating means to move said actuating member into contact with said surface upon axial movement thereof whereby, upon contact of said actuating member with said surface and circumferential rotation thereby, to abut and move said engaging member into contact with said surface.

9. A clutch mechanism comprising, in combination: a pair of coextensive shaft members adapted for relative rotation; a conical axial recess in one of said shafts, said recess having a radially inwardly directed conical surface; anchor means associated with the other such shafts and projecting axially into said conical recess; an actuating member mounted for axial and circumferential movement on said anchor means, said actuating member having a conical portion engageable with said conical surface of said recess; an engaging member; means normally urging said engaging member away from said surface of said recess; unidirectional stop means carried by said surface of said engaging member and adapted for association with said anchor means; operating means to move said actuating member into contact with said surface upon axial movement thereof whereby, upon contact of said actuating member with said surface and circumferential rotation thereby, to abut and move said engaging member into contact with said surface; and spring means for returning said actuating member to its initial position.

10. A clutch mechanism comprising, in combination: a pair of coextensive shaft members adapted for relative rotation; an axial recess in one of said shafts, said recess having a radially inwardly directed surface; anchor means associated with the other of such shafts and projecting axially into said recess; an actuating member mounted for axial and circumferential movement on said anchor means, said actuating member having a portion engageable with said surface; an engaging member positioned in said recess adjacent said actuating member; unidirectional stop means carried by said engaging member and adapted for association with said anchor means; an axially extending inclined plane carried by said anchor means; and operating means to move said actuating member along said inclined plane and into contact with said surface upon axial movement thereof, said operating means having a flexible connection with said actuating member whereby, upon contact of actuating member with said surface and circumferential rotation thereby, to abut and move said engaging member into contact with said surface.

11. A clutch mechanism comprising, in combination: a pair of coextensive shaft members adapted for relative rotation; a cylindrical axial recess of one of said shafts, said recess having a radially inwardly directed cylindrical surface; anchor means associated with the other of said shafts and projecting axially into said cylindrical recess; an actuating member mounted for axial and circumferential movement on said anchor means, said actuating member having a portion engageable with said cylindrical surface; an engaging member positioned in said recess adjacent said actuating member, said engaging member comprising a relatively thin spring-like band for normally urging said engaging member away from said surface; unidirectional stop means carried by said engaging member and adapted for association with said anchor means; an axially extending inclined plane carried by said anchor means and adapted to slidably support said actuating member; operating means to move said actuating member along said inclined plane and into contact with said surface upon axial movement thereof, said operating means having a flexible connection with said actuating member whereby, upon contact of said actuating member with said surface and circumferential rotation thereby, to abut and move said engaging member into contact with surface; and spring means for returning said actuating member to its initial position.

12. A clutch mechanism comprising, in combination: a pair of coextensive shaft members adapted for relative rotation; a cylindrical axial recess in one of said shafts, said recess having a radially inwardly directed cylindrical surface; anchor means formed integral with the other of said shafts and projecting axially into said cylindrical recess; an actuating member mounted for axial and circumferential movement on said anchor means, said actuating member having a portion engageable with said cylindrical surface; an engaging member positioned in said recess adjacent said actuating member, said engaging member comprising a relatively thin spring-like band for normally urging said engaging member away from said cylindrical surface; unidirectional stop means carried by said engaging member and adapted for association with said anchor means; an axially entending inclined plane carried by said anchor means and adapted to support said actuating member for axial movement thereon; operating means to move said actuating member along said inclined plane and into contact with said surface upon axial movement thereof, said operating means having a flexible connection with said actuating member whereby, upon contact of actuating member with said surface and circumferential rotation thereby, to abut and move said engaging member into contact with said surface; and springs means for returning said actuating member to its initial position.

References Cited in the file of this patent

UNITED STATES PATENTS

| | | |
|---|---|---|
| 129,914 | Weston | July 30, 1872 |
| 2,273,496 | Perry | Feb. 17, 1942 |